United States Patent [19]

Heckel et al.

[11] Patent Number: 5,298,210
[45] Date of Patent: Mar. 29, 1994

[54] METHOD FOR SUPPRESSING BUBBLES IN CALENDERED ELASTOMER

[75] Inventors: Klaus Heckel, Gorxheimertal; Herbert Arnold, Morlenbach; Gerhard Graab, Mannheim, all of Fed. Rep. of Germany

[73] Assignee: Firma Carl Freudenberg, Weinheim, Fed. Rep. of Germany

[21] Appl. No.: 626,915

[22] Filed: Dec. 13, 1990

[30] Foreign Application Priority Data

Dec. 22, 1989 [DE] Fed. Rep. of Germany ....... 3942505

[51] Int. Cl.$^5$ .............................................. B29C 43/24
[52] U.S. Cl. ..................................... 264/112; 264/119; 264/131; 264/175; 264/211; 264/347
[58] Field of Search ............... 264/112, 131, 122, 175, 264/331.13, 211, 109, 347, 37, 119; 524/570–571, 588; 525/101, 105; 425/201

[56] References Cited

U.S. PATENT DOCUMENTS

| | | | |
|---|---|---|---|
| 3,267,187 | 8/1966 | Slosberg et al. | 264/122 |
| 3,378,506 | 4/1968 | Rockoff | 264/122 |
| 3,499,956 | 3/1970 | Mountain | 264/112 |
| 3,658,947 | 4/1972 | Ito et al. | 264/175 |
| 3,969,458 | 7/1976 | Hunter | 264/154 |
| 4,005,054 | 1/1977 | Bonnefon et al. | 264/331.13 |
| 4,196,162 | 4/1980 | Stichter | 264/347 |
| 4,361,655 | 11/1982 | Tyler | 264/209.1 |
| 4,481,335 | 11/1984 | Stark, Jr. | 264/331.13 |
| 4,826,638 | 5/1989 | Hopperdietzel | 264/28 |

FOREIGN PATENT DOCUMENTS

| | | | |
|---|---|---|---|
| 3623795 | 10/1987 | Fed. Rep. of Germany . | |
| 51-28154 | 3/1976 | Japan | 264/112 |
| 60-63119 | 11/1985 | Japan | 264/331.13 |

OTHER PUBLICATIONS

German Patent Application M 38 72 XII/39a; date of publication Jul. 22, 1941, reinstated and published Oct. 30, 1952.

*Primary Examiner*—Jeffery Thurlow
*Attorney, Agent, or Firm*—Kenyon & Kenyon

[57] ABSTRACT

The invention involves the use of about 1 to 4 %wt cured elastomer irregularly-shaped particles having a sieve size of about 0.7 mm +/−0.1 mm in uncured elastomer to suppress bubble formation without substantial loss of tensile strength, in calendered, cured elastomer products, such as, decorative or sealing sheet materials.

8 Claims, No Drawings

METHOD FOR SUPPRESSING BUBBLES IN CALENDERED ELASTOMER

FIELD OF THE INVENTION

The present invention relates to a method and composition for making calendered elastomer with a reduced amount of bubbles formed therein and without a significant loss of tensile strength of the fully cured elastomer.

BACKGROUND OF THE INVENTION

Conventional manufacturing of decorative elastomeric (rubber) sheeting materials, strip-shaped sealing materials and the like, involves preparing a blank of uncured elastomer having a selected width, for example, 2 mm, using a calender method followed by a continuous vulcanization (curing) process. A common problem with this approach is that a substantial number of bubbles often form in the calendered blank. The bubbles may cause defects in a finished product produced from a calendered blank, such as, poor appearance, for example, unsightly surface blemishes, and/or could affect the operativeness of the product, for example, weakening or preventing proper sealing of a sealing tape. These common defects may also lead to waste, due to rejection of substantial quantities of such materials, during the manufacturing process.

The number and size of bubbles formed in the calendered blank is known to be linked to the composition, mixing conditions and viscosity of the uncured elastomer. However, limitations, such as, cost of materials, specifications for the appearance of a finished product, for example, optical clarity, and technical requirements of processing equipment; often restrict the alternatives available to a manufacturer in the selection of the uncured elastomer to be used to make a calendered product.

German Patent 36 23 795 (U.S. Pat. No. 4,826,638) is directed to making elastomeric products having a defined, irregular surface which is produced by mixing uncured elastomer with 5 to 60 parts hardened (cured) elastomer particles, per 100 parts uncured elastomer. The hardened elastomer particles are sized in the range of 0.1 mm to 1.0 mm and are made by cooling elastomer material in liquid nitrogen and grinding the cold material in a ball mill or impact pulverizer. Such a manufacturing process is uneconomical because it consumes large amounts of energy. The German Patent does not discuss bubble formation in the cured elastomer.

OBJECTS AND SUMMARY OF THE INVENTION

It is an object of the present invention to provide bubble-free calendered elastomeric blanks for manufacturing vulcanizable products such as sealing tapes and decorative sheeting.

It is another object of the present invention to provide a simple and cost effective method for suppressing bubble formation in calendered elastomeric blanks used for manufacturing vulcanizable products.

It is yet another object of the present invention to provide a method for suppressing bubble formation in calendered elastomeric blanks used for manufacturing vulcanizable sheeting that does not require substantial changes in existing manufacturing practice or significant changes in elastomer compositions or cause a substantial loss of tensile strength in the fully cured elastomer sheets produced from the blanks.

The present invention provides a method for suppressing bubble formation in a calendered elastomer blank and vulcanized sheet material prepared therefrom, comprising the steps of preparing a mixture of uncured elastomer including about 1 to about 4% wt of said particulate (based on the weight of the mixture) of uniformly distributed, irregularly-shaped, cured elastomer particulate having a sieve size of about 0.7 mm +/−0.1 mm; and, forming said mixture into a fully vulcanized, calendered sheet of specified thickness. The method may also include the steps of uniformly distributing about 5 to 50 g/m$^2$ of a cured elastomer particulate, having a particle size of about 20 to about 80% of the sheet thickness, onto a surface of the uncured elastomer mixture; and pressing the distributed particulate into the surface with a smooth roller at a pressure of about 3 to about 15 bar prior to vulcanization of the uncured elastomer.

The pressed mixture usually exhibits a Mooney viscosity of ML 1+4 at 100° C. 120.

A preferred particle size for the particulate distributed on the surface of the uncured mixture is between about 20% and 80% of the thickness of the fully cured sheet product. Surface bubble formation may be further suppressed by embossing the surface after the particulate has been applied. The embossing is believed to enhance the effects of venting bubble gas from the uncured elastomer caused by embedding the particulate. The embossing procedures are conventional, for example, rolling with a properly shaped roller or embossing paper to imprint a pattern during the curing process.

The present invention also provides a composition for making a calendered elastomer blank comprising a mixture of an uncured elastomer including about 1 to about 4% wt (based on the weight of the mixture) of uniformly dispersed irregularly-shaped, cured elastomer particulate having a sieve size of about 0.7 mm +/−0.1 mm.

DETAILED DESCRIPTION OF THE INVENTION

The particulate may be prepared by comminuting larger pieces of cured elastomer in an impact pulverizer (cooling is not necessary) and separating the fraction of comminuted particles having the desired sieve size, i.e., 0.7 mm +/−0.1 mm by a conventional sieve separation method. The term sieve size is used to describe a particulate comprised of particles having an average diameter in the desired size range. The particulate may be multi-colored or monochromatic and selected to match the cured elastomer or to achieve some decorative effect to improve the appearance of the final product. The particulate may be thoroughly mixed with the uncured elastomer to uniformly distribute the particles in the preferred amount of about 1 to 4% wt based on the total weight of the mixture of uncured elastomer and particulate. The particulate used for pressing into the surface of the uncured elastomer mixture surface may be prepared and sized by similar techniques.

The data presented in the following illustrative Examples demonstrates that bubble formation is suppressed and the mechanical properties (tensile strength) of the cured elastomer product is maintained when the embedded cured elastomer particulate are sieve sized at about 0.7 mm +/−0.1 mm and comprise about 1 to about 4% wt based on the weight of the uncured elastomer and particulate. In the Examples, when the quantity of particulate is less than about 1 %wt its effect is not seen; but, when the particulate significantly exceeds about 3 % wt the tensile strength of the cured mixture decreases. At 5 % wt particulate the tensile strength of the fully cured product is decreased by about 10% and tensile strength continues to decrease as the quantity of particulate increases.

The following Examples are presented to further illustrate subject invention.

EXAMPLE I

An uncured elastomer is prepared having the following formula:

| INGREDIENT | PBW |
| --- | --- |
| Styrol-butadiene rubber (23% styrol) | 100 |
| Styrene-butadiene copolymer (85% styrol) | 20 |
| Silicic acid ppt. | 40 |
| Kaolin | 70 |
| Chalk ppt. | 30 |
| Coumarone-indene-resin | 15 |
| Zinc oxide | 5 |
| Stearic acid | 1.5 |
| Sulphur | 2.5 |
| Polyethylene glycol | 3.0 |
| Cyclohexylbenzthiazolesulfenamide | 2.7 |
| Tetramethylthiuramdisulfide | 0.5 |

A portion of the elastomer is cured; ground into particulate and separated into particulate fractions having sieve sizes of 0.1, 0.7, 1.5, and 7.0 mm. The separated particulates are mixed with 100 g portions of uncured elastomer in the amounts shown in Table 1 below.

TABLE 1

Identification of Samples A to T by Sieve Size and Quantity/100 g

| Quantity/100 g | 1 g | 3 g | 5 g | 7 g | 15 g |
| --- | --- | --- | --- | --- | --- |
| [Sieve Size] | | [Samples] | | | |
| 0.1 mm | A | B | C | D | E |
| 0.7 mm | F | G | H | I | J |
| 1.5 mm | K | L | M | N | O |
| 7.0 mm | P | Q | R | S | T |

An elastomer control "U" without any particulate is also tested.

Samples A to U are made into continuous sheets 2 mm thick on a three-roll calender machine at 80° C. and vulcanized at 170° C., with a compacting pressure of 10 bar and operating speed of 80 m/hr. The bubbles in the finished sheets are counted and the results for each Sample are summarized in Table 2 below.

TABLE 2

Bubbles/m$^2$ in the Finished Sheet for Samples A to T

| SAMPLE | BUBBLES/m$^2$ | SAMPLE | BUBBLES/m$^2$ |
| --- | --- | --- | --- |
| A | 14 | K | 4 |
| B | 12 | L | 2 |
| C | 11 | M | 3 |
| D | 11 | N | 7 |
| E | 10 | O | 12 |
| F | 2 | P | 12 |
| G | 0 | Q | 10 |
| H | 2 | R | 10 |
| I | 4 | S | 16 |
| J | 7 | T | 18 |
| | | U | 15 |

The tensile strength of the Samples vulcanized at 170° C. show the influence of particle size and addition quantity of the particulate and are listed in Table 3 below for Samples B, G, L, Q, F, G, H, and I.

TABLE 3

Tensile Strength (MPa) of Selected Samples

| SAMPLE | TENSILE STRENGTH (MPa) |
| --- | --- |
| B | 9.2 |
| G | 9.1 |
| L | 8.7 |
| Q | 7.9 |
| F | 9.2 |
| G | 9.1 |
| H | 8.8 |
| I | 8.0 |
| J | 7.2 |
| U | 9.3 |

The data in Table 2 demonstrates that bubble formation is suppressed when the particulate sieve size is 0.7 mm +/−0.1 mm. The tensile strength data in Table 3 demonstrates that the tensile strength of the cured elastomer begins to decrease when the particulate exceeds about 3 % wt and markedly declines, i.e., about 10% at about 5 %wt particulate.

EXAMPLE 2

An uncured elastomer is prepared having the following formula:

| INGREDIENT | PBW |
| --- | --- |
| Acrylonitrile-butadiene rubber (acrylonitrile 28%) | 100 |
| Styrol-butadiene copolymer (60% styrol) | 20 |
| Silicic acid ppt. | 20 |
| Kaolin | 60 |
| Chalk ppt. | 20 |
| Zinc oxide | 5 |
| Stearic acid | 1.5 |
| Sulphur | 2.7 |
| Diethylene glycol | 3.2 |
| Cyclohexylbenzthiazolesulfenamide | 2.9 |
| Tetramethylthiuramdisulfide | 0.7 |

Particulate of various sizes is prepared and mixed with uncured elastomer as described in Example 1 and used to make the Samples for bubble and tensile strength measurements as described in Table 4 below.

TABLE 4

Bubbles/m$^2$ and Tensile Strength (MPa) vs. Particulate % Wt for Particulate of Various Sizes

| PARTICULATE % WT | 1 | 3 | 5 | 7 | 15 |
| --- | --- | --- | --- | --- | --- |
| Bubbles/m$^2$ | 6 | 0 | 4 | 7 | 12 |
| Tensile Strength (MPa) | 12.0 | 11.5 | 10.5 | 9.6 | 7.1 |

The data in Table 4 confirms that presented in Example 1, indicating that the compositions including about 3% wt cured elastomer particles having a sieve size of about 0.7 mm +/−0.1 mm produced bubble-free elastomer without a substantial loss in tensile strength.

What is claimed is:

1. A method for suppressing bubble formation in a calendered elastomer sheet, comprising the steps of: preparing a mixture of uncured elastomer including about 1 to about 4% wt (based on the weight of the mixture) of uniformly distributed, irregularly-shaped, cured elastomer particulate having a sieve size of about 0.7 mm +/−0.1 mm, forming said mixture into a calendered elastomer sheet, and vulcanizing said sheet to a specified thickness.

2. The method of claim 1, further comprising the steps of uniformly distributing about 5 to about 50 g/m$^2$ of cured elastomer particulate, having a particle size of about 20 to about 80% of the specified sheet thickness, onto a surface of the mixture of uncured elastomer including cured elastomer particulate; and pressing the distributed particulate into the surface with a smooth roller at a pressure of about 3 to about 25 bar prior to vulcanization of the uncured elastomer.

3. The method of claim 2, further comprising the step of: embossing the pressed surface prior to vulcanization.

4. The method of claim 2, wherein the pressed mixture exhibits a Mooney viscosity of ML 1+4 at 100° C. of about 120.

5. The method of claim 1, wherein the cured elastomer particulate and the uncured elastomer having substantially the same composition.

6. The method of claim 2, wherein the cured elastomer particulate and the uncured elastomer have substantially the same composition.

7. The method of claim 1, wherein the elastomer comprising a polymer selected from the group consisting of styrene-butadiene and acrylonitrile-butadiene rubbers.

8. The method of claim 2, wherein the elastomer comprising a polymer selected from the group consisting of styrene-butadiene and acrylonitrile-butadiene rubbers.

* * * * *